Oct. 18, 1938.  E. W. ROESSLER  2,133,872
SELECTIVE CONTROL FOR AIR CONDITIONING APPARATUS
Filed July 23, 1935
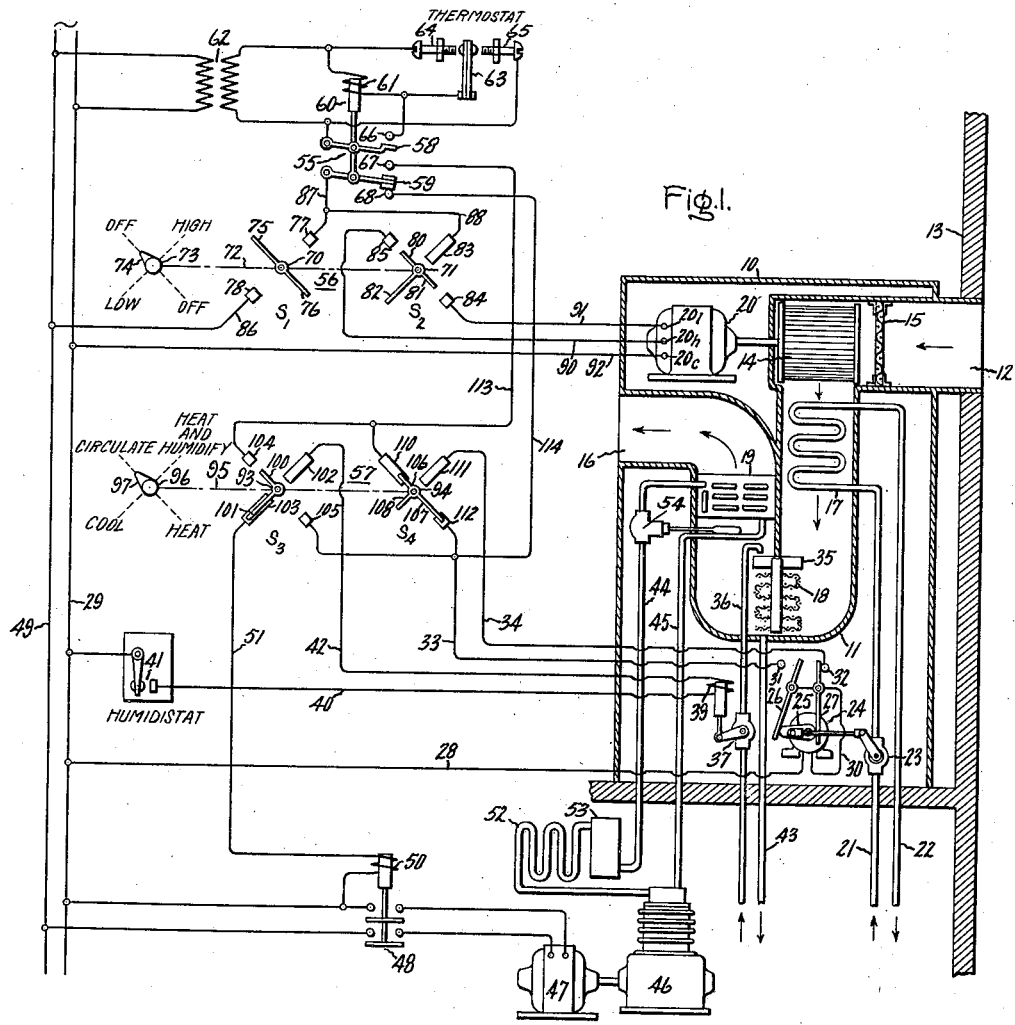
Inventor:
Edward W. Roessler,
by Harry E. Dunham
His Attorney.

Patented Oct. 18, 1938

2,133,872

UNITED STATES PATENT OFFICE 2,133,872

SELECTIVE CONTROL FOR AIR CONDITIONING APPARATUS

Edward W. Roessler, Schenectady, N. Y., assignor to General Electric Company, a corporation of New York Application July 23, 1935, Serial No. 32,758

16 Claims. (Cl. 236—44)

The present invention relates to control for air conditioning apparatus and has for a principal object the provision of an improved selective control system for increasing the flexibility, efficiency and reliability of operation of air conditioning apparatus designed for the performance of a plurality of different functions.

In air conditioning work, apparatus is frequently employed which is designed for year around operation to maintain desired conditions of temperature, humidity and air motion. For proper operation such apparatus necessarily must be capable of selectively performing the different functions of air circulation, cooling, heating, humidification and dehumidification and, generally, also of filtration. (The term "circulation" as used herein is to be understood to include the functions of "circulation" and "ventilation" as the latter two terms are generally understood in the art.) During certain periods of the year, when the weather is mild, it is found to be sufficient and desirable from the standpoint of economy to operate the apparatus solely for circulation and filtration of air, while in the warmer periods of the year it is usually desired that the apparatus operate also for cooling and dehumidification and in the colder periods of the year for heating and generally humidification in addition to circulation and filtration.

Although not necessarily limited thereto, the subject matter of the present invention is particularly suited for the control of year around air conditioning apparatus. An important object of the invention is the provision of a control system for such air conditioning apparatus whereby the apparatus may be selectively preset for operation in accordance with the seasonal desires of an operator and the apparatus will thereafter function automatically to maintain desired conditions within the zone to which the conditioned air is supplied.

More specifically an object of the present invention is the provision of an improved control system for air conditioning apparatus which is selectively operable for air circulation, cooling, heating and humidification, which control system combines manually operable selective means whereby an operator can select a plurality of different types of operation, such as circulation alone or circulation plus either cooling, heating, or heating and humidification, with thermal responsive control means for controlling automatically the selected operation of the apparatus in accordance with variations in the temperature of a zone to which the conditioned air is supplied.

A further object of the invention is the provision in such a control system of interlocking means by which it is made impossible to effect operation of the apparatus to simultaneously perform inconsistent functions such as cooling and heating or cooling and humidification.

Another object of the invention is the provision in a control system for air conditioning apparatus which includes air circulating means, of selective means for rendering the circulating means operative at different rates to circulate different volumes of air, and interlock means for rendering the apparatus totally inoperative when the circulating means is rendered inoperative.

Still another object of the invention is the provision in a control system for air conditioning apparatus which includes a plurality of means for conditioning air together with means for circulating the conditioned air and automatically operative means for controlling the operation of the conditioning means, of selective means for rendering the circulating means operative either independently of any of the conditioning means or concurrently with a predetermined one of the conditioning means under control of the automatically operative means.

A specific object is to provide a selective conditioning control of the above character wherein a single thermostat responsive to air temperature is connected to operate the heating means upon a decrease in temperature and to operate the cooling means upon an increase in temperature when the selection is made between heating and cooling operations.

Other objects of the invention will become apparent from the ensuing description, taken in conjunction with the accompanying drawing, in which are set forth for purposes of illustration the details of arrangement and operation of a preferred embodiment of the invention and a modification thereof.

In the drawing, Fig. 1 shows diagrammatically air conditioning apparatus designed for year around operation and illustrates schematically a control system therefor embodying features of the present invention. Fig. 2 illustrates schematically a modification of the control system of Fig. 1.

Referring to Fig. 1, 10 designates an air conditioning apparatus diagrammatically illustrated as being of the type commonly referred to as a unit air conditioner. The apparatus is provided with an air treating duct 11 having an intake 12 extending through the wall 13 of a room or other zone to which conditioned air is to be supplied, into communication with atmosphere. A motor driven fan or like circulating means 14 is disposed in the duct for drawing air thereinto through inlet 12 and a filter screen 15, and for forcing the air through the duct and out through the discharge port 16 into the room.

A plurality of air conditioning devices are disposed within the duct 11 in the path of the circulated air including a heating unit or radiator 17, a humidifying unit 18 and a cooling unit 19. Fan 14 is connected to be driven by means of electric motor 20. The fan motor may be either single or multi-speed, but is illustrated in the preferred embodiment of Fig. 1 as being of the two-speed type having a high speed winding connection terminal 20h, a low speed winding connection terminal 20l and a common connection terminal 20c.

Radiator 17 is illustrated as being connected to receive heating medium such as steam, vapor or hot water, through supply pipe 21 from any suitable source such as a central heating plant (not shown), while return pipe 22 is provided for conveying the heating medium back to the source. Control of the flow of heating medium in pipes 21 and 22 may be accomplished in various ways well known in the art, but in the preferred embodiment illustrated, such control is accomplished by means of a valve 23 inserted in supply line 21 and connected to be actuated by an electric motor 24 through the agency of crank arm 25 which also serves as a cam for the operation of pivotally mounted limit switch elements 26 and 27. One side of motor 24 is connected by means of conductor 28 to conductor 29 which constitutes one side of an electric supply circuit connected to any suitable source of alternating current energy (not shown). The other side of the motor is connected by means of conductor 30 to both limit switch elements 26 and 27 which are adapted to engage contact terminals 31 and 32 respectively of control circuit conductors 33 and 34. Valve 23 is illustrated in the closed position with switch element 27 engaging contact 32 and switch element 26 disengaged from contact 31. Upon energization of conductor 34 in a manner to be pointed out hereinafter, motor 24 rotates to open valve 23 through the agency of crank arm 25. Rotation of the motor through 180° causes the crank arm to move switch element 27 from engagement with contact 32, to thereby stop the motor, and switch element 26 into engagement with contact 31. Subsequently, energization of conductor 33 causes the motor to rotate again, this time to close valve 23, and rotation of the crank arm 25 through another 180° disengages switch element 26 from contact 31 to stop the motor and moves switch element 27 into engagement with contact 32 preparatory to a repetition of the energization of conductor 34 for effecting opening of the valve.

Humidifying unit 18 is illustrated as being of the screen stack type disclosed in U. S. Letters Patent No. 2,006,928 of Sidney E. Miller but it is to be understood that other types of humidifying units may also be used. Numeral 35 designates a water distribution pan from which water drains down over the layers of the evaporating screen stack 18 and to which water is supplied from any suitable source (not shown) by means of supply pipe 36 under control of valve 37. As illustrated, valve 37 is of the solenoid type operable from closed to open position upon energization of its electromagnetic coil 39. One side of the coil 39 is arranged to be connected by means of conductor 40 either directly to conductor 29 of the electric supply line or, as illustrated in the preferred embodiment, through the contacts of humidistat 41 which is disposed in the room or other zone to which conditioned air is to be supplied by the apparatus. The other side of coil 39 is connected to control circuit conductor 42 so that energization of conductor 42 in a manner hereinafter to be pointed out results in energization of coil 39, providing the humidistat 41 is calling for humidity and the contacts thereof are closed. Valve 37 is thereupon opened and water flows through pipe 36 into pan 35 and downwardly onto the screen stack of the humidifying unit 18 where the greater portion evaporates into the air flowing in the duct 11. A drain pipe 43 is provided for carrying away unevaporated water.

Cooling unit 19 is illustrated as constituting the evaporator of a refrigeration system and is connected, by means of supply line 44 and suction line 45, for the circulation therethrough of refrigerant from compressor 46. The compressor is arranged to be driven by electric motor 47 which is connected through the contacts of relay 48 to be energized from conductors 29 and 49 of the previously referred to supply circuit. Relay 48 is operated by means of electromagnetic coil 50, one side of which is connected to conductor 29 of the supply circuit and the other side of which is connected to control circuit conductor 51. Upon energization of conductor 51, and thereby of coil 50, in a manner hereinafter to be pointed out, the contacts of relay 48 are closed to effect operation of motor 47 to drive compressor 46. Gaseous refrigerant is discharged from the compressor into a condenser 52 wherein the refrigerant is cooled and liquefied, and thence passes into liquid receiver 53. From the liquid receiver the refrigerant passes through supply line 44 in regulated quantities, under the control of thermostatic valve 54, to the cooling unit or evaporator 19 where it is vaporized due to the heat drawn from the air circulated through the duct 11, and the vaporized refrigerant is then returned to the compressor through suction line 45.

Control of the previously described air circulating and conditioning units to secure selective operation thereof is provided for in accordance with the present invention by the cooperative interconnection of a thermostatically controlled relay 55 and a pair of manually operable selector switches 56 and 57. In the illustrated embodiment of the invention, relay 55 is provided with a pair of movable switch elements 58 and 59 which are arranged to be actuated by armature 60 of an electromagnet having an operating coil 61. The coil 61 is connected to be energized from the electric supply circuit through transformer 62 under control of a thermostat having a bimetallic switch element 63 and adjustable contacts 64 and 65. The thermostat is disposed in the room or zone to which conditioned air is to be supplied and the contacts 64 and 65 may be designated the "hot" and "cold" contacts, respectively, since the bimetallic element 63 is arranged to engage the "cold" contact 65 upon a fall in temperature in the room below a predetermined value and to engage the "hot" contact 64 upon a rise in temperature in the room above a predetermined value. Switch element 58, which is arranged to move into and out of engagement with a fixed contact 66, and switch element 59, which is arranged to operate between fixed contacts 67 and 68, are illustrated in their normal positions where they are biased, as by means of gravity, so that switch element 58 is disengaged from its cooperating contact 66 and switch element 59 is in engagement with fixed contact 68. Engagement of bimetallic element 63 with "cold" contact 65 results in energization of electromagnetic coil 61 from the secondary of transformer 62 to thereby cause movement of switch element 58 into engagement with fixed contact 66, to establish a holding circuit for the relay, while switch element 59 is moved from engagement with fixed contact 68 into engagement with fixed contact 67. Subsequent movement of the bimetallic element from engagement with "cold" contact 65 into engagement with "hot" contact 64, such as would occur upon the satisfaction of the heating requirements of the room, establishes a short circuit around coil 61 to allow the relay to drop out with switch elements 58 and 59 returning to their normal position. As will be evident to one skilled in the art, the improved control system of the present invention is not limited to the specific details of the relay and thermostatic control therefor which forms part of the preferred embodiment illustrated in the drawing, and other suitable types of thermal responsive switching mechanism also may be employed to accomplish the same results.

Referring particularly to Fig. 1, the selector switches 56 and 57 are illustrated by means of a diagrammatic "exploded" view to facilitate an understanding of the construction and operation thereof, but it is to be understood that in practice these two selector switches will assume a more practical and compact form. Selector switch 56 is divided into two parts, designated $S_1$ and $S_2$, and includes a pair of rotatable switch elements 70 and 71 mounted upon a common shaft, indicated at 72, and arranged for selective engagement with a plurality of cooperating fixed long and short contacts. Shaft 72 is arranged to be rotated by means of a control knob 73 having a pointer 74 to indicate on a suitable dial face the positions of the switch elements 70 and 71. Switch element 70 has a pair of long prongs 75 and 76 extending outwardly from shaft 72 in diametrically opposite directions and arranged to engage selectively a pair of fixed short contacts 77 and 78 angularly spaced 180° from each other. Switch element 71 is provided with a pair of short prongs 80 and 81 extending outwardly from the shaft 72 in opposite directions, and a long prong 82 extending outwardly from the shaft along a radius displaced 90° in a clockwise direction (as viewed on the drawing) from short prong 81. The long prong 82 of switch element 71 is arranged to engage selectively a long fixed contact 83 and also a pair of short fixed contacts 84 and 85 disposed diametrically opposite to each other with short contact 84 angularly spaced 90° in a clockwise direction from long contact 83. Short prongs 80 and 81 are arranged to engage only long contact 83. The fixed contacts of switches $S_1$ and $S_2$ have such angular arrangement that long contact 83 of switch $S_2$ is in a position corresponding to short contact 77 of switch $S_1$, while the switch elements 70 and 71 are so mounted on shaft 72 that prongs 75 and 76 of switch element 70 correspond in angular position to the prongs 80 and 81, respectively, of switch element 71.

Of the part designated $S_1$ of selector switch 56, contact 78 is connected to conductor 49 of the electric supply circuit by means of conductor 86, while contact 77 is connected by means of conductor 87 to the switch element 59 of relay 55 and by means of conductor 88 to contact 83 of the part designated $S_2$ of the selector switch. Contacts 84 and 85 of $S_2$ are connected to the high speed winding connection terminal $20_h$ and the low speed winding connection terminal $20_l$, respectively, of the fan motor 20 by means of conductors 90 and 91, respectively. The third or common connection terminal $20_c$ of the fan motor 10 is connected by means of conductor 92 to conductor 29 of the electric supply circuit.

Selector switch 57, divided into parts designated $S_3$ and $S_4$, is similar to selector switch 56 and has a pair of switch elements 93 and 94 mounted upon a common rotatable shaft indicated at 95. A plurality of fixed long and short contacts are arranged for cooperation with the rotatable switch elements. Shaft 95 is adapted to be rotated by means of control knob 96 having a pointer 97 for indicating on a suitable dial the positions of the rotatable switch elements. Switch element 93 of $S_3$ is provided with a short prong 100 and a long prong 101 extending outwardly from the shaft 95 at right angles to each other with prong 101 angularly spaced in a counterclockwise direction (as viewed on the drawing) from the prong 100. The short prong 100 is arranged to engage either of a pair of long fixed contacts 102 and 103, placed in diametrically opposite positions with respect to each other, while long prong 101 is arranged to engage selectively not only the long contacts 102 and 103 but also a pair of short contacts 104 and 105 arranged in diametrically opposite positions with respect to each other with contact 104 angularly spaced 90° in a clockwise direction from contact 103. Switch element 94 of $S_4$ is provided with a short prong 106 and a long prong 107 extending outwardly from shaft 95 in opposite directions, and a short prong 108 extending outwardly from the shaft along a radius angularly spaced 90° in a counterclockwise direction from prong 106. The short prongs 106 and 108 are arranged to engage either a long fixed contact 110 or a long fixed contact 111 displaced 90° in a clockwise direction from the contact 110, while long prong 107 is arranged to engage selectively not only the long fixed contacts 110 and 111 but also a short fixed contact 112 which is displaced 90° in a clockwise direction from the long contact 111. Fixed contacts 110, 111 and 112 of $S_4$ correspond in angular position to the fixed contacts 104, 102 and 105, respectively, of $S_3$, while prongs 106 and 108 of switch element 94 correspond in angular position with prongs 100 and 101, respectively, of switch element 93.

As will be seen from the drawing, fixed contact 67 of relay 55 is connected to conductor 113, which may be designated the heating control bus for both switches $S_3$ and $S_4$, while fixed contact 68 of the relay is connected to conductor 114 which may be designated the cooling control bus for both switches $S_3$ and $S_4$. Fixed contacts 104 and 110 of switches $S_3$ and $S_4$, respectively, are connected to bus 113, while fixed contacts 105 and 112 of the switches $S_3$ and $S_4$, respectively, are connected to bus 114. The two control circuit conductors 33 and 34 for the heating valve operating motor and associated limit switch mechanism are connected, respectively, to bus 114 and the fixed contact 111 of switch $S_4$. Control circuit conductor 42 interconnects fixed contact 102 of switch $S_3$ and the electromagnetic coil 39 of the humidifier control valve 37, while control circuit conductor 51 interconnects fixed contact 103 of switch S₃ and the electromagnetic coil 58 of the compressor motor control relay 48.

The manner in which the control system of the present invention serves for effecting selective operation of the air conditioning apparatus illustrated in Fig. 1 will be apparent from the foregoing description. However, the following outline will summarize the various circuit connections and resultant operations of the apparatus corresponding to the various settings of control knobs 73 and 96 and the operation of thermostatically controlled relay 55.

When knob 73 is in either of the "Off" positions, as indicated on the drawing, the air conditioning apparatus is rendered totally inoperative since the feed line to the switch element 59 of relay 55 and to the fan motor control contact 83 is broken at switch S₁.

Rotation of knob 73 into the position labelled "High" on the drawing results in the energization of the switch element 59 of relay 55 and also in operation of motor 20 to drive the fan 14 at its high rate of speed. With the knob in this position, switch element 70 of switch S₁ is positioned so that prong 76 is in engagement with contact 78 and prong 75 is in engagement with contact 77, while switch element 71 is in such position that prong 82 is in engagement with contact 85 and prong 80 is in engagement with contact 83. The circuit connections are as follows: From conductor 49 of the electric supply line through feed conductor 86, contact 78, prong 76, prong 75, contact 77, and conductor 87 to switch element 59 of relay 55; also from contact 77 through conductor 88, contact 83 of switch S₂, prong 80, prong 82, contact 85 and control circuit conductor 90 to terminal 20ₕ of fan motor 20, the return circuit being from terminal 20c through conductor 92 to conductor 29 of the electric supply circuit.

With the knob 73 in the position labelled "Low", switch element 59 of relay 55 is energized and motor 20 is also energized to drive the fan 14 at low speed. Prongs 75 and 76 of the switch element 70 of switch S₁ are in engagement with contacts 78 and 77, respectively, while prongs 81 and 82 of switch element 71 of switch S₂ are in engagement with contacts 83 and 84, respectively. The circuit connections are as follows: From conductor 49 through feed conductor 86, contact 78, prong 75, prong 76, contact 77 and conductor 87 to switch element 59; also from contact 77 through conductor 88, contact 83 of switch S₂, prong 81, prong 82, contact 84, and conductor 91 to terminal 20ₕ of the fan motor 20, the return circuit being from the terminal 20c through conductor 92 to conductor 29 of the electric supply circuit.

If control knob 96 of selector switch 57 is in the position illustrated and labelled "Circulate", fan motor 20 rotates at the speed determined by the setting of control knob 73 while none of the other units of the air conditioning apparatus is in operation, except that if the heating medium control valve 23 is in its open position at the time knob 96 is turned to "Circulate", a circuit is established to insure closing of this valve. Such a circuit extends, depending upon the position of switch element 59 of relay 55, either from contact 67 of the relay through bus 113, contact 110 of switch S₄, prong 106, prong 107, and contact 112 to control circuit conductor 33 or from contact 68 of relay 55 through bus 114 to control circuit conductor 33, and thence to contact 31 of the limit switch control mechanism for motor 24. If valve 23 does happen to be open so that switch element 26 of the limit switch mechanism is in engagement with contact 31, then one of the above outlined circuits from relay 55 is completed from contact 31 through switch element 26, conductor 30, motor 24, and conductor 28 to conductor 29 of the electric supply circuit to thereby cause the motor to rotate 180° to close the valve. It is thus assured that if the control knob 96 is in the position labelled "Circulate", the air conditioning apparatus functions solely for circulation and not for either heating, humidification or cooling.

Assuming that knob 73 is in either one of the positions labelled "High" and "Low", respectively, so that fan 14 is operating at high or low speed, the operation of the remaining units of the illustrated air conditioning apparatus will be described for each of the other three presettings of knob 96. When knob 96 is in the position labelled "Heat and humidify", long prong 101 and short prong 100 of switch element 93 of switch S₃ are in engagement with short contact 104 and long contact 102, respectively, while short prong 108 and short prong 106 of switch element 94 of switch S₄ are in engagement with long contact 110 and long contact 111, respectively, thus establishing or presetting partial control circuits for the opening of the humidifier valve 37 and the heating medium control valve 23. The control circuit for the valve 37 extends from contact 67 of relay 55 through heating bus 113, contact 104 of switch S₃, prongs 101 and 100 of switch element 93, contact 102, conductor 42, electromagnetic coil 39, conductor 40 and the contacts of humidistat 41 to conductor 29 of the electric supply circuit. The circuit for motor 24 extends from bus 113 through contact 110 of switch S₄, prongs 108 and 106 of the switch element 94, contact 111, conductor 34, contact 32 of the limit switch mechanism, switch element 27, conductor 30, motor 24 and conductor 28 to conductor 29 of the electric supply circuit. If the room in which the thermostat is placed is at or above the desired temperature, thermostatic element 63 is disengaged from "cold" contact 65 and the electromagnetic coil 61 of relay 55 is deenergized so that switch element 59 is out of engagement with contact 67. Under these circumstances bus 113 is deenergized and valves 37 and 23 remain closed. However, if the temperature in the room is below the desired minimum, thermostatic element 63 moves into engagement with "cold" contact 65 causing energization of the coil 61 to move the switch element 59 of relay 55 from engagement with contact 68 into engagement with contact 67, thereby energizing bus 113 completing the above outlined partial control circuits for opening of humidifier valve 37 (provided that the contacts of humidistat 41 are closed) and heating medium control valve 23. As previously pointed out, energization of motor 24 results in rotation thereof 180° to open valve 23 and also to move switch element 27 out of engagement with contact 32 and switch element 26 into engagement with contacts 31 whereupon motor 24 becomes deenergized.

If knob 96 is rotated into the position labelled "Heat", switch element 93 is positioned so that its long prong 101 is in engagement with long contact 102 of switch S₃ and short prong 100 is out of engagement with any of the fixed contacts, while at the same time switch element 94 is so positioned that its long prong 107 and its short prong 108 are in engagement with long contacts 110 and 111, respectively, of switch S⁴, short prong 106 being free. Consequently, the control circuit for motor 24 is preset or partially established as described in the preceding paragraph, but no control circuit is preset for the energization of electromagnetic coil 39. In this case operation of switch element 59 of relay 55 from engagement with contact 68 into engagement with contact 67 upon a call for heat by the thermostat, completes only the control circuit for energization of motor 24 to open valve 23 as previously outlined, but humidifier valve 37 remains closed.

Rotation of knob 96 into the position labelled "Cool" causes rotation of switch element 93 into such position that its short prong 100 and its long prong 101 are in engagement with long contact 103 and short contact 105, respectively, of switch S₃, while only the long prong 107 of switch element 94 is in engagement with a fixed contact of switch S⁴, namely, long contact 111. With this presetting, two control circuits are partially established, one for the energization of relay 48 to start operation of the compressor driving motor 47 and the other an interlock circuit for assuring operation of motor 24 to close the heating medium control valve 23. The first of these partial circuits extends from contact 68 of relay 55 through cooling bus 114, contact 105 of switch S₃, prongs 101 and 100 of switch element 93, contact 103, conductor 51, electromagnetic coil 50 and thence to conductor 29 of the electric supply circuit. The other partial control circuit extends from contact 68 through bus 114, control circuit conductor 33 to contact 31 of the limit switch mechanism associated with motor 24. When the knob 96 is turned into the position labelled "Cool", the fixed contacts of the thermostat also should be set for a predetermined maximum temperature in the room. Then when the temperature exceeds this predetermined maximum, thermostatic element 63 moves into engagement with the "hot" contact 64 of the thermostat so that electromagnetic coil 61 is deenergized and relay 55 drops out with the result that switch element 59 engages contact 68 to energize bus 114, thereby completing both of the partial control circuits previously outlined in this paragraph. Under such circumstances, coil 50 is energized to close the contacts of relay 48 and thereby effect energization of motor 47 from supply conductors 29 and 49 with the result that the compressor 46 operates to supply refrigerant to cooling unit 19 in the manner previously described in detail. At the same time, if switch element 26 of the limit switch mechanism is in engagement with contact 31, motor 24 is energized to close valve 23, whereas if switch element 27 is in engagement with contact 32, motor 24 remains deenergized and valve 23 remains closed as it should be during operation of the apparatus to cool the circulated air. When the temperature in the room has fallen below the predetermined desired minimum for which the thermostat is set, thermostatic element 63 moves into engagement with "cold" contact 65 to cause energization of electromagnetic coil 61 to pick up relay 55 and move switch element 59 from engagement with contact 68 into engagement with contact 67 to thereby deenergize bus 114. Under these circumstances, the control circuit for electromagnetic coil 50 is broken and relay 48 drops out to deenergize motor 47 and stop compressor 46.

It will be clear from the previous description that the two-position thermostatically controlled contact 59 is automatically connected by the selective switches 56 and 57 so as reversely or oppositely to control the heating and cooling operations when the selection is made between heating and cooling. Thus heating operation occurs when the thermostatically controlled switch 59 is in its upper position and stops when the switch is moved into its lower position. Conversely, the cooling operation occurs when the switch 59 is in its lower position and stops when the switch is moved into its upper position. This reversed control arrangement enables the single two-position thermostatically controlled switch 59 to control both the heating and the cooling operations.

It will be seen from the previous description that numerous interlocking arrangements are provided to prevent improper operation of the air conditioning apparatus. First, selector switching device 56 is so arranged that when both the fan motor control circuits are broken at switch S₂, the main feed circuit to thermostatically controlled relay 55 is also broken at switch S₁. Second, selector switching device 57 is so arranged that control circuit conductor 51 can only be energized from cooling bus 114 while control circuit conductors 34 and 42 can only be energized from heating bus 113, and the selective action of switch element 59 of relay 55 is such that the busses 113 and 114 cannot be simultaneously energized. Hence the electromagnetic coil 39 and the motor 24 cannot be energized for effecting opening of the humidifier valve 37 and the heating medium control valve 32, respectively, at the same time that electromagnetic coil 50 is energized to close the contacts of relay 48 for effecting energization of the compressor driving motor 47. Third, the connecting of control circuit conductor 33 to both short contact 112 of switch S⁴ and bus 114 assures that the motor 24 will be operated to close the valve 23 whenever knob 96 is set at either "Cool" or "Circulate", or whenever switch element 59 of relay 55 is in engagement with contact 68 which is connected to the cooling bus 114. And lastly, the manner in which the selector switch 57 and the thermostatically controlled relay 55 are connected in the system makes it impossible for an operator by manual presetting to render the apparatus operative to perform a particular function unless that function is the correct one in view of temperature conditions as indicated by the thermostat, and, on the other hand, makes it impossible for the relay to render the apparatus operative to perform a particular function unless that function is desired as indicated by the setting of the control knob. In other words, operation of the apparatus to perform a particular function can be secured only by coincidental manual and thermostatically controlled selection, and selection of improper functions or combinations of functions is rendered impossible.

Referring particularly to Fig. 2, there is schematically illustrated therein a modification of the control system described hereinbefore, this modification being primarily directed toward providing an arrangement whereby the motor driven fan or other circulating means may be operated either independently of the operation of any of the conditioning units or concurrently with a predetermined one of the conditioning units under thermostatic control. The same numerals are used to designate those parts in Fig. 2 which are also found in Fig. 1.

Th thermostatic mechanism for operation of switch element 59 is not shown in Fig. 2 but it is to be understood that the control of the operation of this element is to be effected automatically in response to temperature variation in a manner similar to that pointed out in connection with Fig. 1. At 50 is represented diagrammatically the coil of relay 48, while 39 and 41 indicate diagrammatic representations of the coil of solenoid valve 37 and the humidistat, respectively. Numeral 120 indicates a single speed fan driving motor, labelled "FM", while 121 designates a motor and limit switch mechanism, labelled "HT", for controlling the operation of a heating medium control valve in the manner previously described in connection with the parts designated 24 to 27 and 30 to 32 in Fig. 1.

The rotatable switch elements and the stationary contacts of the switches S3 and S4 of the embodiment illustrated in Fig. 2 are the same as those of the embodiment illustrated in Fig. 1. On the other hand, slight modifications occur in the switches S1 and S2. In addition to the short fixed contacts 77 and 78 of switch S1, there is also a long fixed contact angularly spaced 90° in a counterclockwise direction from contact 77 and designated by numeral 122. Switch element 70 is provided with an additional short prong 123 angularly spaced 90° in a counterclockwise direction from long prong 75. Switch S2 is provided with an additional long fixed contact 124 disposed diametrically opposite the long contact 83. Switch S2 is provided also with a rotatable switch element 125 (in place of switch element 71) having a short prong 126 corresponding in angular position to long prong 76 of switch element 70 of switch S1, and a long prong 127 angularly spaced 90° in a counterclockwise direction from prong 126.

Coil 50 is connected by means of conductor 51 to long contact 124 of switch S2, and short contact 84 of switch S2 is connected by means of conductor 128 to long contact 103 of switch S3. It will thus be seen that the control circuit for relay 48, which controls the energization of compressor motor 47, must extend not only through switch S3, as in the embodiment illustrated in Fig. 1, but also through switch S2. A bridging connection between contact 111 of switch S4 and contact 83 of switch S2 is provided by means of the conductor 130. As in the embodiment illustrated in Fig. 1, short contact 77 of switch S1 is connected by means of conductor 87 to switch element 59 of relay 55, but the connection between contact 77 and the contact 83 of switch S2 is omitted. One side of fan motor 120 is connected by means of conductor 92 to conductor 29 of the electric supply circuit while the other side of the fan motor is connected by means of conductor 131 to the fixed contacts 122 and 85 of switches S1 and S2, respectively. The remainder of the electrical connections of the control system illustrated in Fig. 2 are the same as those for the control system illustrated in Fig. 1.

The operation of the control system illustrated in Fig. 2 is similar in certain respects to that of the control system illustrated in Fig. 1. As will be remembered from the previous description of operation, it was pointed out that energization of control circuit conductor 34 results in operation of the motor and limit switch mechanism, designated in Fig. 2 as 121, to effect opening of the heating medium control valve 23, while energization of control circuit conductor 33 results in operation of the motor and limit switch mechanism to effect closing of valve 23. Similarly, energization of control circuit conductor 42 results in energization of coil 39 to effect opening of the humidifier valve 37, and energization of control circuit conductor 51 results in energization of coil 50 of relay 48 to effect starting of the compressor motor 47. Likewise, when control knob 96 is in the position labelled "Circulate", no operation of the humidifying, heating or cooling unit takes place regardless of the operation of the fan. Likewise, when knob 73 is turned into either of the positions labelled "Off", the circulating unit and all the conditioning units are rendered totally inoperative.

Then, with particular reference to the embodiment of Fig. 2, the setting of control knob 73 in the position labelled "Run" causes switch element 70 to assume such position that switch element 59 of relay 55 is energized from conductor 49 through conductor 86, contact 78 of switch S1, prongs 76 and 75 of switch element 70, contact 77 and conductor 87, while at the same time fan motor 120 is energized, the circuit extending from conductor 49 of the supply circuit through conductor 86, contact 78, prong 76, prong 123, contact 122, conductor 131 and conductor 92 back to the electric supply circuit of conductor 29. Also switch element 125 of switch S2 assumes such position that its short prong 126 and long prong 127 are in engagement with long contact 124 and short contact 84, respectively, of switch S2. Hence, with knob 73 in the "Run" position, partial control circuits may be selectively preset as previously described by means of knob 96 and the corresponding switches S3 and S4 for operation of the apparatus to cool, heat, or heat and humidify. These partial control circuits would be completed by means of the thermostatically controlled switch element 59 also as previously described in connection with Fig. 1. However, with regard to the presetting of the partial control circuit for operation of the apparatus to cool, it will be seen that in the embodiment illustrated in Fig. 2, such circuit would extend from contact 68 through cooling bus 114, contact 105 of switch S3, prongs 101 and 100 of switch element 93, contact 103, conductor 128, contact 84 of switch S2 prongs 127 and 126 of switch element 125, contact 124, control circuit conductor 51 and electromagnetic coil 50 to conductor 29 of the supply circuit.

Rotation of control knob 73 into the position labelled "Standby" results in rotation of switch element 70 of switch S1 into such position that switch element 59 of relay 55 is energized from conductor 49 of the electrical supply circuit through conductor 86, short contact 78, long prong 75, long prong 76, short contact 77, and conductor 87 as previously described, but in this case no circuit is established by switch S1 for the direct energization of the fan motor 120. At the same time switch element 125 of switch S2 is positioned so that the partial circuit between short contact 84 and long contact 124 is broken to thereby prevent energization of control circuit conductor 51, while a partial circuit is established between long contact 83 and short contact 85 by means of short prong 126 and long prong 127 to thereby connect the fan motor control circuit conductor 131 through conductor 130 to long contact 111 of switch S4 in parallel with control circuit conductor 34. Under these conditions, no control circuit can be completed for effecting operation of the compressor driving motor 47 since as was previously pointed out the circuit is broken at switch S2. However, partial control circuits may be established by means of knob 96 and its associated switching mechanism to selectively preset the apparatus for operation to heat or to heat and humidify in the manner previously pointed out. Now, when knob 96 is set at either of the positions labelled "Heat" or "Heat and humidify", the fan motor control circuit conductor 131 is energized concurrently with energization of control circuit conductor 34 so that the fan motor is started and stopped concurrently with opening and closing, respectively, of the heating medium control valve 23 in response to operation of the thermostatically controlled switch element 59 of relay 55.

From the foregoing discussion it will be understood that the embodiment of the invention illustrated in Fig. 2 provides a control system whereby the fan may be caused to operate either continuously or intermittently under control of the thermostat when the air conditioning apparatus is placed in condition for heating, and, on the other hand, the apparatus can be caused to function for cooling only when the fan is set for continuous operation. And, as in the previous embodiment, rendering the fan totally inoperative is effective to render all the conditioning units totally inoperative.

What I claim as new and desire to secure by Letters Patent in the United States is:

1. In a control system for a unit air conditioning apparatus selectively operable for circulating air and for performing different air conditioning functions, a selector device manually presettable for preparing said apparatus to operate solely for circulation of air or for performance of different selected ones of said conditioning functions concurrently with circulation, a thermostatically controlled device operative for controlling the operation of said apparatus in the performance of any of said conditioning functions, and a master control device selectively operable for rendering said apparatus either totally inoperative or operative in accordance with the setting of said selector device.

2. In a control system for air conditioning apparatus having means for circulating air, means for cooling the circulated air and means for heating the circulated air, means selectively operable for effecting operation of said circulating means alone and jointly with either said cooling means or said heating means including a pair of selector devices having interconnected therebetween a thermal responsive means for controlling the operation of said cooling means and said heating means, one of said selector devices being operable for transferring the control of said circulating means to said thermal responsive controlling means and being provided with interlock means for preventing operation of said cooling means when said circulating means is under the control of said thermal responsive controlling means.

3. In a control system for air conditioning apparatus including a plurality of means selectively operable for conditioning air, a separate electrical control circuit for each of said plurality of means, a plural position selector switch connected in all said separate circuits and manually operable for presetting either predetermined ones of said circuits singly or predetermined ones of said circuits in combination, a relay operable selectively for connecting different predetermined groups of said circuits to a source of electric energy, and thermal responsive means operatively connected for controlling the operation of said relay.

4. In a control system for an air conditioning apparatus including a plurality of separate means selectively operable for respectively cooling, heating and humidifying air, a separate electrical control circuit for each of said separate means, a plural position selector switch connected in said circuits and operable into one position for presetting the circuit of both said heating means and said humidifying means and operable into two other positions for presetting the circuit of said heating means and the circuit of said cooling means, respectively, and thermal responsive means automatically operable for controlling the energization of the preset circuits from a source of electric energy.

5. In a control system for air conditioning apparatus including an air circulating fan, a motor for driving said fan having high and low speed windings, and a plurality of separate means selectively operable for conditioning the air circulated by said fan, an electric feed circuit, a separate electrical control circuit for each of said separate air conditioning means, thermostatically controlled switching means automatically operative for selectively connecting different ones of said conditioning means control circuits to said feed circuit and a selector switching device manually operable for connecting said feed circuit to a source of electric energy and for selectively connecting said high speed windings and said low speed windings to said feed circuit.

6. A control system for air conditioning apparatus which apparatus includes a motor-driven fan for circulating air and separate means selectively operable for cooling, heating and humidifying the circulated air, said control system including an electrical feed circuit, a control circuit for said fan motor, separate control circuits for said cooling, heating and humidifying means, respectively, a manually operable switch connected in the cooling means control circuit, a manually operable switch connected in the heating means control circuit, a manually operable switch and a humidistat connected in the humidifying means control circuit, said three manually operable switches being operable for selectively presetting their corresponding control circuits, a relay operative in one position for connecting the cooling means control circuit to said feed circuit and operative in a second position for connecting the heating means control circuit and the humidifying means control circuit to said feed circuit, thermostatic means operatively connected for effecting operation of said relay between said two positions and master control switching means manually operable for connecting said feed circuit to a source of electric energy and for connecting the fan motor control circuit to said feed circuit.

7. In a system for supplying conditioned air to a space, the combination including heating means, cooling means, means for circulating air conditioned by said means into said space, a thermal responsive device located within said space and have two definite controlling positions, and a pair of cooperating selective means having different positions for connecting said thermal responsive device for separately and oppositely controlling the operation of said heating and cooling means in response to temperature variations, said selective means having connections for operating said air circulating means under the control of said thermal responsive device when heating is selected and continuously when cooling is selected.

8. In a control system for air conditioning apparatus including means for circulating air and separately operable heating and cooling means for conditioning the circulated air, a thermostat automatically operative in response to variations in the air temperature, a selective device having one position for operation of said circulating means independently of said conditioning means and different other positions for rendering said thermostat operative for oppositely controlling the operation of said heating and cooling means in accordance with temperature changes, and a cooperating selective device having one position for stopping operation of the circulating means and said conditioning means, a second position for effecting independent operation of said circulating means and a third position for connecting said circulating means to be operated concurrently with said heating means under the control of said thermostat and to be operated continuously when said cooling means is under the control of said thermostat.

9. In combination, air conditioning apparatus having a plurality of different elements selectively operable for conditioning the air, a first automatic control means operative respectively to variations in a characteristic of the conditioned air, a first selector control unit operable selectively into different positions for selectively presenting predetermined ones of said elements for operation singly and predetermined ones of said elements for operation jointly under the control of said automatic means, a second automatic control means operative responsively to variations in a different characteristic of the conditioned air and connected for controlling the joint operation of one of said elements jointly with said first automatic control means, and a second selector unit operable selectively for rendering said automatic control means effective and ineffective to control the operation of the selected elements and simultaneously controlling the operation of a different one of said elements.

10. Apparatus for supplying conditioned air to a zone having in combination a plurality of elements selectively operable for conditioning air, means operable for delivering to said zone the air conditioned by operation of said elements, means for effecting operation of said air delivery means singly and jointly with different ones of said element including a start and stop control device and a separately operable plural position selector device operable into one position for selecting operation of said air delivery means singly and into different positions for selecting different predetermined ones of said elements for operation jointly with said air delivery means and operable into another position for selecting a predetermined group of said elements for operation jointly with said air delivery means, and means including an automatic control device responsive to variations in a characteristic of the air within said zone connected with said selector device for controlling the operation of each selected element.

11. In combination, air conditioning apparatus having means for circulating air to a zone and a plurality of elements selectively operable for conditioning the circulated air, a manually operable selector control device presettable into different positions for selecting operation of said air circulating means singly and for selecting different ones of said elements for operation jointly with said air circulating means, master control means operable between two positions for starting and stopping operation of said circulating means and for simultaneously with the starting of operation of said circulating means rendering operable the one of said elements selected for operation by said selector device, and means including a thermostatic device located within said zone and connected with said selector device for controlling the operation of each selected element, said master control device being operable into a third position for rendering said circulating means operable under the control of said thermostatic device jointly with a predetermined one of said elements.

12. In a control system for air conditioning apparatus having blower means operable at different rates of speed for circulating different volumes of air and a plurality of means selectively operable for conditioning the circulated air, means for selecting operation of said blower means singly and different ones of said conditioning means for operation jointly with said blower means, a master control device operable selectively for effecting operation of said blower means at each of said different rates of speed upon operation of said selective means to select single operation of said blower means and for simultaneously rendering operable the selected conditioning means upon operation of said selective means to select one of said conditioning means for operation jointly with said blower means and thermostatically controlled means connected with said selective means for controlling the operation of the selected conditioning means.

13. In combination, air conditioning apparatus having an air circulating element and different elements selectively operable for heating, cooling and humidifying the circulated air, a pair of plural position selector devices interconnected in one position of one thereof and each of two positions of the other thereof for jointly effecting separate operation of said air circulating elements at different rates dependent upon the position of said other control device, means including a thermostat responsive to air temperature and said one of said selector devices having different other positions for selecting said elements for operation to cool the circulated air, to heat the circulated air and to heat and humidify the circulated air under the control of said thermostat, said means including a humidistat controlling jointly with said thermostat the humidifying of the circulated air, and the other of said selector devices being connected in said two positions thereof for rendering said elements operative in accordance with the setting of said one selector device and for varying the operation of the air circulating element to control the rate of air circulation.

14. In combination, air conditioning apparatus having means for circulating air and separate elements selectively operable for cooling, heating and humidifying the circulated air, means for controlling operation of said air circulating means including a plural position selector device manually presettable into one position for selecting operation of said air circulating means alone and into each of three other positions for selecting respectively said cooling element for operation with said air circulating means, said heating element for operation with said air circulating means, and said heating element and said humidifying element for operation jointly wth said air circulating means, and means including a thermostat for controlling the operation of each element selected by said selector device, said means including a humidistat for controlling jointly with said thermostat the operation of the humidifying element.

15. In combination, air conditioning apparatus having a plurality of different elements selectively operable for conditioning air, a separate electrical control circuit for each of said elements, a pair of control switches connected for selectively controlling said separate circuits with one of said switches operable into different positions for selectively presetting a predetermined one of said separate circuits for energization singly and selected other ones of said separate circuits for energization jointly with said predetermined one circuit under the control of the other of said control switches, and means including a thermostatic switch interconnected between said control switches for automatically controlling energization of said other selected circuits.

16. In combination, air conditioning apparatus having electrically controlled air circulating means and a plurality of electrically controlled elements selectively operable for conditioning the circulated air, a thermostatic switch, means for placing selected ones of said conditioning elements in condition for operation under the automatic control of said thermostatic switch including a plural position control switch selectively operable for partially establishing control circuits under the control of said thermostatic switch for predetermined ones of said elements singly and predetermined ones of said elements jointly, and a master control switch connected for simultaneously effecting energization of said air circulating means and for completing said partially established control circuits.

EDWARD W. ROESSLER.

CERTIFICATE OF CORRECTION.

Patent No. 2,133,872.   October 18, 1938.

EDWARD W. ROESSLER.

It is hereby certified that error appears in the printed specification of the above numbered patent requiring correction as follows: Page 5, first column, line 1, for "$S^4$" read $S_4$; page 8, first column, line 25, claim 9, for "respectively" read responsively; line 29, same claim, for the word "presenting" read presetting; and that the said Letters Patent should be read with this correction therein that the same may conform to the record of the case in the Patent Office.

Signed and sealed this 27th day of December, A. D. 1938.

Henry Van Arsdale (Seal)   Acting Commissioner of Patents.